United States Patent
Georgiou et al.

(10) Patent No.: US 8,523,487 B2
(45) Date of Patent: Sep. 3, 2013

(54) CO-DISPOSAL AND CO-STORAGE OF DESALINATION CONCENTRATED BRINE WASTE PRODUCT AND CARBON DIOXIDE WASTE PRODUCT

(75) Inventors: Christos John Georgiou, Scarsdale, NY (US); Ulisses Thibes Mello, Blauvelt, NY (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 12/491,527

(22) Filed: Jun. 25, 2009

(65) Prior Publication Data
US 2010/0326924 A1    Dec. 30, 2010

(51) Int. Cl.
*B65G 5/00* (2006.01)

(52) U.S. Cl.
USPC ............................................. 405/129.35

(58) Field of Classification Search
USPC .......... 405/53, 55, 57, 129.1, 129.35, 129.45, 405/302.7, 428
See application file for complete search history.

(56) References Cited

U.S. PATENT DOCUMENTS

| | | | |
|---|---|---|---|
| 5,397,553 A | | 3/1995 | Spencer |
| 5,632,336 A * | | 5/1997 | Notz et al. ................... 166/402 |
| 5,916,246 A | | 6/1999 | Viegas et al. |
| 6,149,344 A * | | 11/2000 | Eaton ....................... 405/129.28 |
| 6,475,460 B1 | | 11/2002 | Max |
| 7,610,962 B2 * | | 11/2009 | Fowler ......................... 166/267 |
| 2006/0196836 A1 * | | 9/2006 | Arakel et al. ................ 210/723 |
| 2007/0151915 A1 * | | 7/2007 | Barber ....................... 210/321.65 |
| 2009/0001020 A1 * | | 1/2009 | Constantz et al. ............ 210/652 |
| 2011/0139455 A1 * | | 6/2011 | Kameyama et al. ........ 166/305.1 |
| 2012/0118586 A1 * | | 5/2012 | Kameyama et al. ........... 166/401 |

OTHER PUBLICATIONS

Babcock, "Mitsubishi Heavy Industries—doing commercial scale carbon capture. Senergy-monitoring CO2 storage", Carbon Capture Journal, Jan./Feb. 2008, pp. 1-14, Issue 1.
Doughty et al., "Modeling Supercritical CO2 Injection in Brine-Bearing Formations", Research Summaries 2002-2003.
Doughty et al., "Modeling Supercritical Carbon Dioxide Injection in Heterogenous Porous Media", Vadose Zone Journal, 2004, 3:837-847.
McPherson et al., "CO2 Sequestration in Deep Aquifers".
Pederson et al., "Artesian (Confined) Aquifers and Effect of Pumping", Cooperative Extension, Institute of Agriculture and Natural Resources, University of Nebraska-Lincoln.
Nassar et al., "Impact of desalination plants brine injection wells on coastal aquifers", Environ Geol, 2008, 54:445-454.

(Continued)

*Primary Examiner* — David Bagnell
*Assistant Examiner* — Kyle Armstrong
(74) *Attorney, Agent, or Firm* — Thomas A. Beck; Daniel P. Morris

(57) ABSTRACT

A method for disposal of desalination concentrated brine waste product from a desalination process provides that the desalination concentrated brine waste product is injected, along with a carbon dioxide waste product, typically into an imperviously capped porous rock formation, typically including a saline aquifer. The desalination concentrated brine waste product and the carbon dioxide waste product (i.e., which may be injected as a supercritical liquid) may be injected simultaneously or sequentially. The method provides for environmentally acceptable disposal of the desalination concentrated brine waste product and the carbon dioxide waste product.

14 Claims, 3 Drawing Sheets

(56) References Cited

OTHER PUBLICATIONS

Piri et al., "Carbon Dioxide Sequestration in Saline Aquifers: Evaporation, Precipitation and Compressibility Effects", Fourth Annual Conference on Carbon Capture and Sequestration DOE/NETL, May 2-5, 2005.

Xu et al., "Reactive Geochemical Transport Simulation to Study Mineral Trapping for CO2 Disposal in Deep Saline Arenaceous Aquifers", pp. 1-66, Earth Sciences Division, Lawrence Berkeley National Laboratory, University of California, Berkeley, CA 94720, USA.

"Best Practice for the Storage of CO2 in Saline Aquifers", Observations and guidelines from the SACS and CO2STORE projects.

"CO2 EOR Technology: Technologies for Tomorrow's E&P Paradigms", U.S. Department of Energy, Office of Fossil Energy, National Energy Technology Laboratory.

"Ground water: Wells", USGS—Science for a Changing World.

"Introduction to Desalination Technologies in Australia", Summary Report, Sep. 2, 2002.

"Resource Management Issues: Desalination", Monterey Bay National Marine Sanctuary, pp. 1-6.

"The ABC of Aquifers", American Ground Water Trust.

\* cited by examiner

CO-DISPOSAL AND CO-STORAGE OF DESALINATION CONCENTRATED BRINE WASTE PRODUCT AND CARBON DIOXIDE WASTE PRODUCT

BACKGROUND

The invention relates generally to industrial waste disposal. More particularly, the invention relates to environmentally acceptable methods for industrial waste disposal.

Desalination is the process by which salts are removed from saline water (i.e., generally seawater) to provide fresh water (i.e., generally potable water). As conventional sources of fresh water continue to be depleted and degraded, particularly in coastal regions, desalination continues to be a desirable option for obtaining fresh water supplies for many residential and commercial needs. Similarly, as desalination processes become more economically efficient within the context of fresh water supplies that may alternatively be obtained from remote fresh water sources, desalination also continues to provide an attractive economic option for providing fresh water supplies for residential and commercial needs, even including those residential and commercial needs that are remote from coastal regions.

In conjunction with the production of fresh water while using a desalination process, there is also produced a desalination concentrated brine waste product. Such a desalination concentrated brine waste product may be considerably more saline and more dense than the saline water source (i.e., typically seawater) feedstock material for the desalination process that produces the fresh water and the desalination concentrated brine waste product. Thus, without sufficient mixing, such a desalination concentrated brine waste product tends to accumulate at a bottom of a saline water body, such as an ocean, into which it is introduced, through an outfall. This high salinity level, and any fluctuation in this high salinity level, may impact sensitive bottom dwelling marine organisms and habitats in the vicinity of such an outfall. Moreover, undesirable impacts of such a desalination concentrated brine waste product outfall effluent may also vary widely as a function of a specific location of such an outfall.

In light of a continuing ability of desalination processes to meet the continuing needs for fresh water supplies in geographic locations that have considerable saline water resources and limited fresh water resources, desirable are methods, systems and apparatus for efficiently and ecologically soundly disposing of desalination concentrated brine waste product from desalination processes.

BRIEF SUMMARY

The invention provides a method for efficiently and ecologically soundly disposing of a desalination concentrated brine waste product from desalination processes, such as reverse osmosis desalination processes. The particular method realizes the foregoing object by injecting the desalination concentrated brine waste product, along with a carbon dioxide waste product, into, typically, an imperviously capped porous rock formation to provide or augment a saline aquifer that is contained by the typically imperviously capped porous rock formation. The method in accordance with the invention not only effectively disposes of and stores the desalination concentrated brine waste product in an environmentally acceptable manner, but also facilitates the disposal and storage of another environmentally unacceptable carbon dioxide waste product in an environmentally acceptable manner. The carbon dioxide waste product may be produced from many carbon dioxide sources, including in particular power plants for combustion of fossil fuels for electric power generation, as well as facilities for the production of oil and natural gas.

A particular method for disposal of a desalination concentrated brine waste product in accordance with the invention includes receiving at a pump station a quantity of desalination concentrated brine waste product from a desalination plant. This particular method also includes receiving at the pump station a quantity of carbon dioxide waste product from a carbon dioxide source. This particular method also includes injecting from the pump station the quantity of desalination concentrated brine waste product and the quantity of carbon dioxide waste product into a porous rock formation operatively connected to the pump station.

A particular method for desalinating water in accordance with the invention includes desalinating a quantity of saline water to provide a quantity of fresh water and a quantity of desalination concentrated brine waste product that is conveyed to a pump station. This particular method also includes receiving at the pump station a quantity of carbon dioxide waste product conveyed from a carbon dioxide source. This particular method also includes injecting from the pump station the quantity of desalination concentrated brine waste product and the quantity of carbon dioxide waste product into a porous rock formation operatively connected to the pump station.

A particular method for sequestering carbon dioxide in accordance with the invention includes operating a carbon dioxide source plant that produces a carbon dioxide waste product that is conveyed to a pump station. This particular method includes receiving at the pump station a quantity of desalination concentrated brine waste product from a desalination plant. This particular method includes injecting from the pump station the quantity of desalination concentrated brine waste product and the quantity of carbon dioxide waste product into a porous rock formation operatively connected to the pump station.

BRIEF DESCRIPTION OF THE SEVERAL VIEWS OF THE DRAWINGS

The objects, features and advantages of the invention are understood within the context of the Description of the Preferred Embodiments, as set forth below. The Description of the Preferred Embodiments is understood within the context of the accompanying drawings, that form a material part of this disclosure, wherein.

DETAILED DESCRIPTION

The invention, which includes a method for disposing of a desalination concentrated brine waste product from a desalination process, in conjunction with a carbon dioxide waste product from another industrial process, is understood within the context of the description set forth below. The description set forth below is understood within the context of the drawings described above. Since the drawings are intended for illustrative purposes, the drawings are not necessarily drawn to scale.

Figure 1:
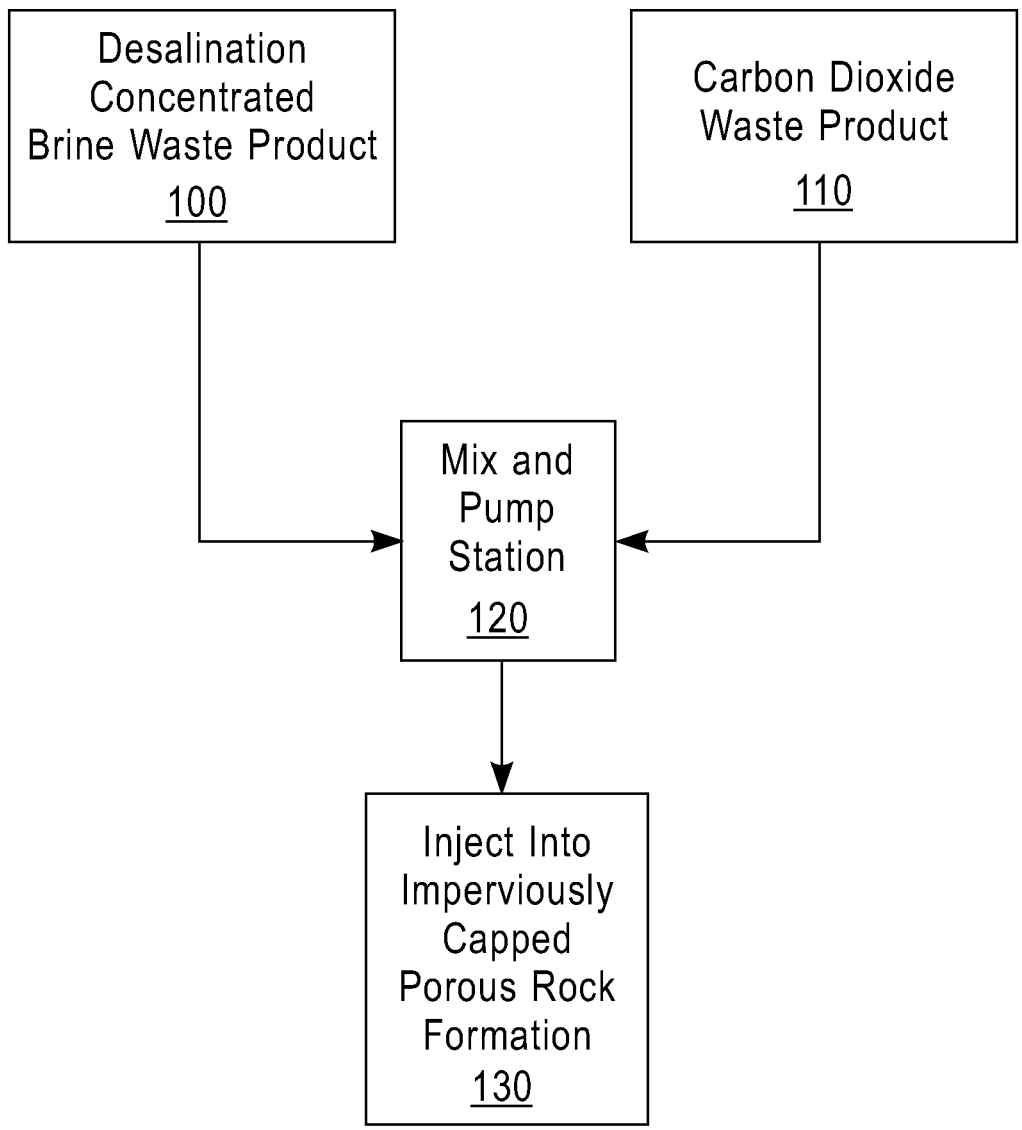
FIG. 1 shows a schematic process flow diagram illustrating a plurality of process steps in accordance with a method that comprises the invention.

FIG. 1 shows a schematic process flow diagram illustrating a plurality of process steps in accordance with a method that comprises the invention.

FIG. 1 first shows a desalination concentrated brine waste product 100. Within the embodiments, the desalination concentrated brine waste product 100 is obtained from a saline water desalination process that is undertaken within a desalination plant, as is discussed and illustrated in further detail below.

FIG. 1 also shows a carbon dioxide waste product 110. Within the embodiments, the carbon dioxide waste product 110 may derive from any of several carbon dioxide sources that result from any of several industrial processes that produce a carbon dioxide waste product, as is discussed and illustrated in further detail below.

Within FIG. 1, the desalination concentrated brine waste product 100 and the carbon dioxide waste product 110 are each conveyed to, and received at, a mix and pump station 120. In a first instance, the desalination concentrated brine waste product 100 and the carbon dioxide waste product 110 may optionally be mixed at the mix and pump station 120 prior to further processing of the desalinated concentrated brine waste product 100 and the carbon dioxide waste product 110 in accordance with the process steps of FIG. 1.

Finally, FIG. 1 at reference numeral 130 shows that the desalination concentrated brine waste product 100 and the carbon dioxide waste product 110 that are conveyed to and received at the mix and pump station 120, and optionally mixed at the mix and pump station 120, are injected into an imperviously capped porous rock formation, although, as noted below, under some circumstances of the embodiment and the invention, suitable porous rock formations need not necessarily be imperviously capped. Such a typically imperviously capped porous rock formation typically comprises an aquifer, and more particularly a saline aquifer, although the embodiments that follow are not intended to be so limited.

As a result of the foregoing injection of the desalination concentrated brine waste product 100 and the carbon dioxide waste product 110 into the imperviously capped porous rock formation from the mix and pump station 120 to which the imperviously capped porous rock formation is operatively connected (i.e., typically intended as fluidly operatively connected), a carbon dioxide enriched saline aquifer is either formed or augmented.

Thus, the schematic process flow diagram of FIG. 1 illustrates a plurality of process steps within a method for co-disposal and co-storage of a desalination concentrated brine waste product 100 and a carbon dioxide waste product 110, by receiving the desalination concentrated brine waste product 100 and the carbon dioxide waste product 110 at a mix and pump station 120, and subsequently injecting the desalination concentrated brine waste product 100 and the carbon dioxide waste product 110 into an imperviously capped porous rock formation to which the mix and pump station 120 is operatively connected, in accordance with reference numeral 130.

Figure 2:
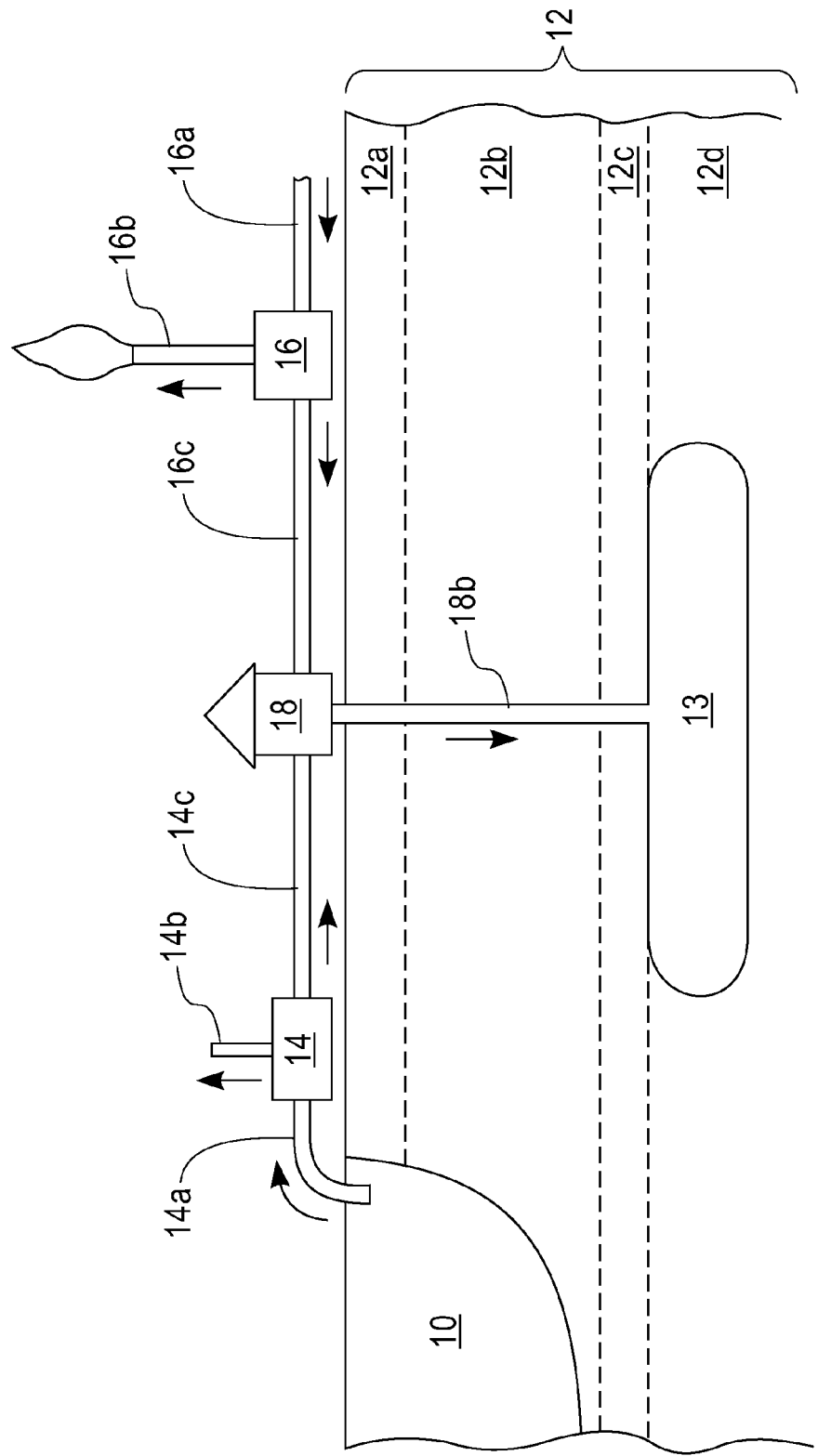
FIG. 2 shows a schematic diagram illustrating components of operation for disposal and storage of a desalination concentrated brine waste product and a carbon dioxide waste product in accordance with a particular embodiment of the invention.

FIG. 2 shows a schematic diagram illustrating components of operation for co-disposal and co-storage of a desalination concentrated brine waste product and a carbon dioxide waste product in accordance with a particular embodiment of the invention. This particular embodiment of the invention comprises a first embodiment of the invention.

FIG. 2 shows a saline water body 10 that adjoins an earth body 12. Both the saline water body 10 and the earth body 12 are not specifically geographically limited within the context of this particular embodiment. Thus, the saline water body 10 and the earth body 12 may be located at any combination of geographic latitude and longitude. From a practical perspective, particular geographic combinations of latitude and longitude that yield locations that experience an arid climate provide more suitable locations to practice this particular embodiment insofar as such locations that experience an arid climate are more likely to experience an unmet need for fresh water, within the context of abundant supplies of saline water.

The earth body 12 that is illustrated in FIG. 2 is stratified into several sub-layers that are more particularly designated by the reference numerals 12a, 12b, 12c and 12d.

Included in particular, in a first instance, is a surface layer 12a that may be a water-bearing layer suitable for providing at least a minimal amount of fresh water, but otherwise an inadequate amount of fresh water, to meet local residential and commercial needs. Such a surface layer 12a may include, but is not necessarily limited to, up to at least several hundred feet within the earth body 12. The surface layer 12a may include any of several geologic formations, such as but not limited to any of various combinations and compositions of sands, soils, clays and rock formations.

Located within the earth body 12, and in particular located beneath and contacting the surface layer 12a, is an intermediate layer 12b. Unlike the surface layer 12a, the intermediate layer 12b typically comprises rock formations of various varieties that may not necessarily be water bearing, although such an absence of water bearing capability is not necessarily a limitation of the embodiment or of the invention. Such rock formations may penetrate to depths of several thousand feet into the earth body 12 beneath and contacting the surface layer 12a.

Located within the earth body 12, and in particular located beneath and contacting the intermediate layer 12b, is an impermeable layer 12c which may also extend for thousands of feet. The impermeable layer 12c is intended to provide an impermeable barrier (i.e., an impervious capping) to up-flow of liquid materials and gaseous materials. As such, the impermeable layer 12c may comprise any of several impervious rock materials, such as but not limited to compacted impervious shale rock materials and impervious salt rock materials.

The impermeable layer 12b may not be needed under all circumstances of the instant embodiment, and in particular under circumstances where injection conditions provide a carbon dioxide waste product 110 from FIG. 1 that is completely dissolved in a desalination concentrated brine waste product 100 from FIG. 1 that is denser than an original aqueous content or saline content of a porous rock formation 130 from FIG. 1. Under such circumstances, the co-mixed and dissolved desalination concentrated brine waste product 100 and the carbon dioxide waste product 110 will naturally flow to a bottom of the aqueous content that comprises the aquifer.

Finally, located within the earth body 12, and below and contacting the impermeable layer 12c is a porous rock layer 12d (i.e., an imperviously capped porous rock formation within the context of the instant embodiment). The porous rock layer 12d may comprise any of several porous rock materials, but in particular the porous rock layer 12d is intended to include porous rock materials that are porous with respect to both the desalination concentrated brine waste product 100 and the carbon dioxide waste product 110 that are illustrated and discussed above within the context of the schematic process flow diagram of FIG. 1.

As is illustrated within the schematic diagram of FIG. 2, an aquifer 13 is located within the porous rock layer 12*d* and contained and constrained from upward movement, if needed, by the presence of the impermeable layer 12*c*. From a practical perspective, the aquifer 13 is preferably a saline aquifer, although the embodiment is also operative under circumstances where the aquifer 13 comprises a fresh water aquifer. As well, the embodiment is also operative under circumstances where the porous rock layer 12*d* does not initially include an aquifer but rather initially includes only an imperviously capped porous rock formation, but such an aquifer is created incident to operation of the method of the invention.

FIG. 2 also shows a desalination plant 14 that is intended to desalinate saline water from the saline water body 10 that is conveyed to the desalination plant 14 through a saline water intake 14*a*. As a result of the desalination process undertaken upon the saline water from the saline water body 10 within the desalination plant 14, there is obtained a fresh water output 14*b* and a desalination concentrated brine waste product 14*c* (i.e., intended as the desalination concentrated brine waste product 100 of FIG. 1). The fresh water supply output 14*b* is intended to be used to supply local residential or commercial needs for fresh water and will not be discussed further here.

The desalination plant 14 may operate within the context of any of several desalination processes. In general, desalination processes include: (1) distillation desalination processes that provide fresh water through evaporation from saline water and condensation of the fresh water evaporate; as well as (2) reverse osmosis desalination processes that provide fresh water through pressurized transfer while using a saline water feedstock and a semi-permeable membrane. Reverse osmosis desalination processes are generally considerably more energy efficient, and for that reason reverse osmosis desalination processes are generally preferred. For either distillation desalination processes or reverse osmosis desalination processes the desalination concentrated brine waste product 14*c* is obtained, and transported or conveyed, through an appropriate means (i.e., including but not limited to discontinuous means such as but not limited to trucking means and continuous means such as but not limited to pipeline means) from the desalination plant 14.

The desalination concentrated brine waste product 14*c* may have a salinity at least twice that of the saline water within the saline water body 10, which is typically seawater, and where seawater has a salinity of about 33 parts per thousand. Thus, a desalination concentrated brine waste product 14*c* from a desalination process within the desalination plant 14 may have a salinity from 40 parts per thousand to 80 parts per thousand.

As described above, and within the context of the foregoing increased levels of salinity, the desalination concentrated brine waste product 14*c* is also considerably denser than seawater, and for that reason will tend to sink to the bottom of an ocean bed if introduced therein through outfall, absent mixing. Similarly, the desalination concentrated brine waste product 14*c* when present on an ocean bed may also compromise ecologically sensitive ocean bed habitats, including related indigenous species.

For the foregoing reasons, in-part, the instant embodiment seeks to provide a method that allows for the environmentally acceptable disposal of the desalination concentrated brine waste product 14*c* from the desalination plant 14 that is illustrated in FIG. 2.

To that end, the schematic diagram of FIG. 2 also shows a carbon dioxide source 16. The carbon dioxide source 16 is most particularly illustrated as a fossil fuel power plant that includes a fossil fuel supply 16*a* (i.e., such as but not limited to a natural gas supply, an oil supply or a coal supply), an effluent emission stack 16*b* and a carbon dioxide waste product 16*c* (i.e., that corresponds with the carbon dioxide waste product 110 of FIG. 1).

However, the particular carbon dioxide source 16 that is illustrated as a fossil fuel power plant in FIG. 2 by no means limits the embodiment or the invention. Rather, the instant embodiment and the invention may also be practiced using any of several carbon dioxide sources for the carbon dioxide source 16, provided that those carbon dioxide sources yield a carbon dioxide waste product such as the carbon dioxide waste product 16*c*. Thus, the carbon dioxide source 16 may include, but is not limited to fossil fuel based electric power generation stations and fossil fuel (such as but not limited to oil and natural gas) production facilities. Any of such facilities are known in the art, and again, any of such facilities do not limit the invention with respect to a carbon dioxide waste product source, such as the carbon dioxide waste product 16*c* from the carbon dioxide source 16 that is illustrated in FIG. 2.

As is understood by a person skilled in the art, the carbon dioxide waste product 16*c* that is illustrated in FIG. 2 also provides a challenge for environmentally acceptable disposal insofar as carbon dioxide comprises a greenhouse gas that is understood as a detrimental contributor to global warming.

Thus, the instant embodiment, and the invention, provide value within the context of addressing environmentally acceptable disposal options and solutions for: (1) the desalination concentrated brine waste product 14*c* from the desalination plant 14 that is illustrated in FIG. 2; and (2) the carbon dioxide waste product 16*c* from the carbon dioxide source 16 that is also illustrated in FIG. 2.

To that end, the schematic diagram of FIG. 2 also illustrates a mix and pump station 18 (corresponding with the mix and pump station 120 that is illustrated in FIG. 1) that receives the desalination concentrated brine waste product 14*c* from the desalination plant 14 and the carbon dioxide waste product 16*c* from the carbon dioxide source 16. Within the mix and pump station 18, the desalination concentrated brine waste product 14*c* and the carbon dioxide waste product 16*c* may optionally be mixed, and both of those materials (i.e., as a solution, a mixture or successively separated quantities and components) are then pumped and injected into the aquifer 13 through an injection bore 18*b* that provides an operative fluid connection to the mix and pump station 18.

Typically the injection of the desalination concentrated brine waste product 14*c* and the carbon dioxide waste product 16*c* into the aquifer 13 from the mix and pump station 18 through the injection bore 18*b* is provided at up to 80 grams per liter salinity (measured as sodium chloride) of the desalination concentrated brine waste product 14*c* and a liquid carbon dioxide waste product 16*c*, either sequentially or mixed. Typically, the injection is undertaken at a temperature greater than 31 degrees centigrade. Typically, the injection is undertaken at a pressure greater than 1070 pounds per square inch when the injection is undertaken at the temperature greater than 31 degrees centigrade. Within the context of the foregoing limitations and parameters for mixing, pumping and injection of the desalination concentrated brine waste product 14*c* and the carbon dioxide waste product 16*c* into the aquifer 13, there is beneficially provided a carbon dioxide waste product 16*c* that is maintained in a supercritical liquid phase (i.e., the carbon dioxide gas phases and carbon dioxide liquid phases are no longer distinguishable).

Alternative injection temperature conditions and injection pressure conditions are also plausible within the context of the instant embodiment so that the carbon dioxide waste product 16c may be maintained in a supercritical liquid phase.

Under such circumstances of the carbon dioxide waste product 16c in a supercritical liquid phase, a buoyancy driven flow of the carbon dioxide waste product 16c is not as critical as when the carbon dioxide waste product 16c is present in a gas phase. The supercritical liquid phase carbon dioxide waste product 16c may partially dissolve in the desalination concentrated brine waste product 14c, but such a supercritical liquid phase carbon dioxide waste product 16c is typically immiscible with the desalination concentrated brine waste product 14c and will thus displace the desalinated concentrated brine waste product 14c within the aquifer 13.

While not wishing to be bound by any particular theory of operation of co-disposal and co-storage of the desalination concentrated brine waste product 14c and the carbon dioxide waste product 16c within the context of FIG. 2, the embodiment contemplates that the carbon dioxide waste product 16c in the presence of the desalination concentrated brine waste product 14c may be a reactive material. However, the injected carbon dioxide waste product 16c, particularly when injected separately from the desalination concentrated brine waste product 14c, may plausibly also be expected to migrate as a separate gaseous phase or liquid phase from the desalination concentrated brine waste product 14c, and due to a buoyancy of such a liquid (or alternatively gaseous) carbon dioxide waste product 14c will need to be securely trapped and retained by the impermeable layer 12c.

As noted above, the instant embodiment also contemplates, to an extent, that the carbon dioxide waste product 16c may completely dissolve in the desalination concentrated brine waste product 14c. Due to a considerably lower buoyancy of such a dissolved carbon dioxide waste product 16c when completely dissolved in the desalination concentrated brine waste product 14c, a need that the impermeable layer 12c provides an entirely secure barrier is reduced.

Finally, and also as noted above, the instant embodiment contemplates that the carbon dioxide waste product 16c may dissolve in the desalination concentrated brine waste product 14c that in-turn is more saline and thus denser, than the saline material that comprises the aquifer 13. Under such circumstances, the carbon dioxide waste product 16c and desalination concentrated brine waste product 14c as dissolved together will sink to the bottom of the aquifer 13 and the impermeable layer 12c may not be needed to trap and retain the carbon dioxide waste product 16c.

As a related consideration under circumstances where the desalination concentrated brine waste product 14c and the carbon dioxide waste product 16c are optionally pre-mixed within the mix and pump station 18, this particular embodiment also contemplates that the carbon dioxide waste product 16c is to some degree soluble within the desalination concentrated brine waste product 14c. Under such circumstances, and due to the subterranean placement of the desalination concentrated brine waste product 14c and the carbon dioxide waste product 16b while using the foregoing injection pressure, a solubility of the carbon dioxide waste product 16c into the desalination concentrated brine waste product 14c may increase in comparison with a solubility of those waste products at atmospheric pressure.

Further from a chemical reactivity perspective, this particular embodiment also contemplates that the carbon dioxide waste product 16c that is injected into the aquifer 13 in conjunction with the desalination concentrated brine waste product 14c may react with water to form carbonic acid (i.e. $H_2CO_3$), and then subsequently dissociate into protons, bicarbonate anions and carbonate anions by virtue of generally conventional chemical kinetic considerations and chemical thermodynamic considerations. In particular, such protons, bicarbonate anions and carbonate anions are further contemplated to potentially be reactive with minerals within the imperviously capped porous rock formation that comprises the aquifer 13. To that end, the presence of the protons, bicarbonate anions and carbonate anions may facilitate or contribute to chemical reactions with the minerals within the foregoing imperviously capped porous rock formations, and thus subsequently also lead to additional mineral deposits within the imperviously capped porous rock formations that may make the imperviously capped porous rock formations less porous. Also considered within the context of an imperviously capped porous rock formation are silicate material reactions with aqueous carbon dioxide, such as but not limited to calcium-aluminum silicate material (i.e. $CaAlSi_2O_8$) reactions with aqueous carbon dioxide. This particular class of reaction form a desirable calcium carbonate reaction product for storage of carbon dioxide, as well as a hydrated aluminum silicate clay product, such as but not limited to $Al_2Si_2O_5(OH)_4$.

Also, as is suggested above, the embodiment contemplates that the aquifer 13, which may comprise a deep (i.e., greater than 800 meters) saline aquifer, is a common geological feature within many geographic locations. To that end, the embodiment thus also contemplates that many carbon dioxide point sources within the context of the carbon dioxide source 16 that is illustrated in FIG. 2 may be readily located over, or at least within a reasonable operative connectivity proximity, of an impervious capped porous rock formation, such as but not limited to a deep saline aquifer, to efficiently facilitate this particular embodiment and further ease implementation of this particular embodiment.

Finally, from a commercial perspective, the embodiment contemplates that an owner entity or an operator entity of the mix and pump station 18 may simply be a receiver (and subsequent injector) of the desalination concentrated brine waste product 14c and carbon dioxide waste product 16c from separate owner entities or operator entities that own or operate the desalination plant 14 or the carbon dioxide source 16. Alternatively, the embodiment also contemplates that the owner entity or the operator entity of the mix and pump station 18 may also be the owner entity or the operator entity of at least one of the desalination plant 14 and the carbon dioxide source 16.

FIG. 2 shows a schematic diagram illustrating components for efficiently co-disposing and co-storing of: (1) the desalination concentrated brine waste product 14c from a desalination process within the desalination plant 14; and (2) the carbon dioxide waste product 16c from another industrial process that is illustrated within the context of the carbon dioxide source 16. The co-disposal and co-storage of the desalination concentrated brine waste product 14c and the carbon dioxide waste product 16c is effected by receiving both the desalination concentrated brine waste product 14c and the carbon dioxide waste product 16c at a mix and pump station 18, and subsequently injecting both the desalination concentrated brine waste product 14c and the carbon dioxide waste product 16c into an imperviously capped porous rock formation, more preferably the aquifer 13 and most preferably a saline aquifer, to which an operative fluid connection is made with the mix and pump station 18.

Such a simultaneous co-disposal and co-storage of the desalination concentrated brine waste product 14c and the carbon dioxide waste product 16c within, preferably, the aquifer 13 simultaneously and environmentally acceptably addresses two industrial waste disposal and storage concerns.

In particular, a first industrial waste disposal concern is addressed with respect to the desalination concentrated brine waste product 14c. This concern derives from an undesirability of releasing a desalination concentrated brine waste product 14c onto an ocean bed through an outfall. In additional a second industrial waste disposal concern is addressed with respect to the carbon dioxide waste product 16c. This particular concern derives from an undesirability of atmospheric release of the carbon dioxide waste product 16c due to global warming considerations.

Figure 3:
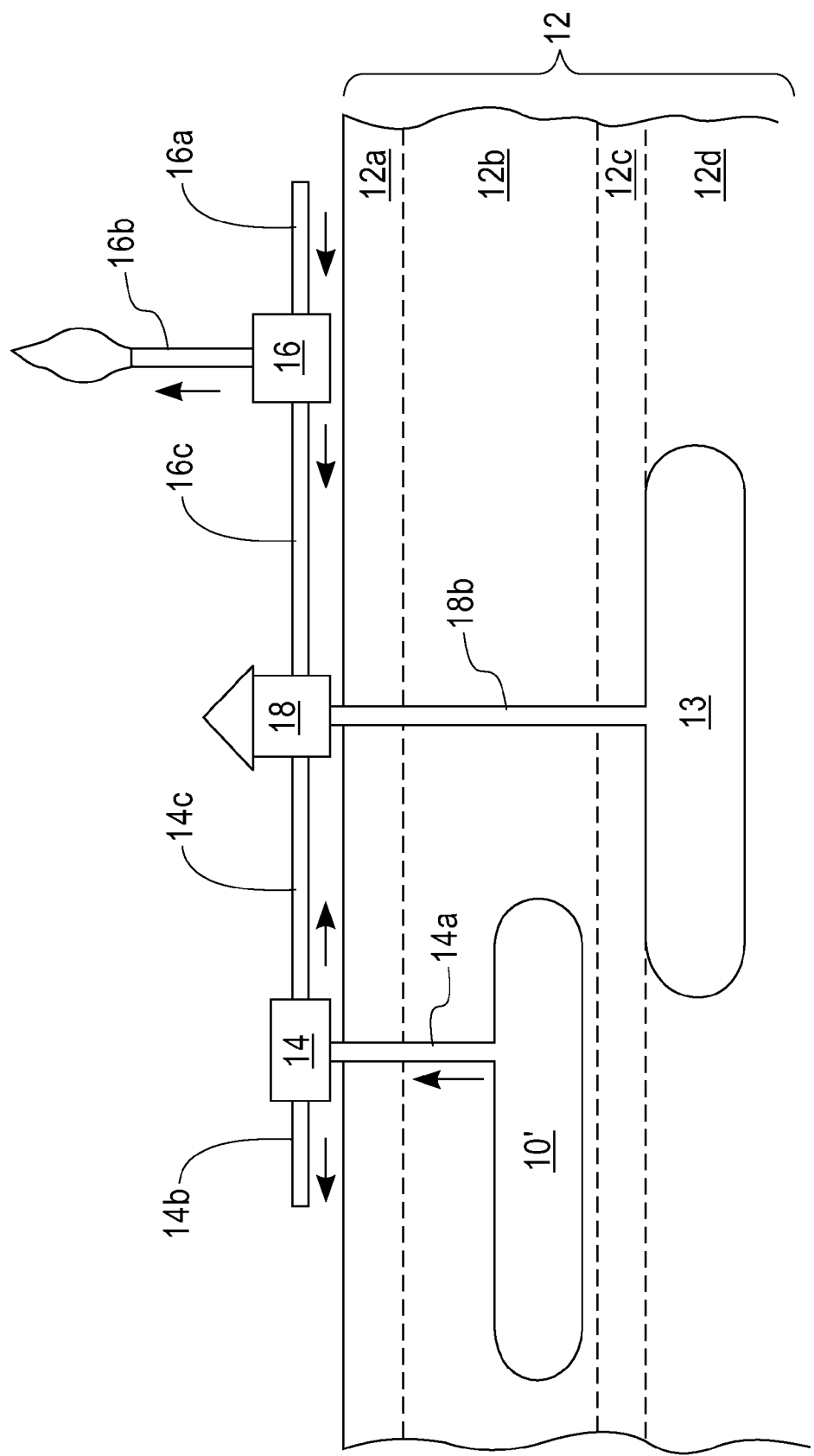
FIG. 3 shows a schematic diagram illustrating components of operation for disposal and storage of a desalination concentrated brine waste product and a carbon dioxide waste product in accordance with another particular embodiment of the invention.

FIG. 3 shows a schematic diagram illustrating components of operation for co-disposal and co-storage of a desalination concentrated brine waste product and a carbon dioxide waste product in accordance with another embodiment of the invention. This other embodiment of the invention comprises a second and final embodiment of the invention.

FIG. 3 shows a schematic diagram of the desalination concentrated brine waste product 14c and the carbon dioxide waste product 16c co-disposal and co-storage components of operation in accordance with the desalination concentrated brine waste product 14c and carbon dioxide waste product 16c co-disposal and co-storage components of operation of FIG. 2. However the components as illustrated in FIG. 3 differ from the components that are illustrated in FIG. 2 in a notable respect, insofar as the saline water body 10 that is illustrated in FIG. 2 as a surface exposed saline water body 10 is now replaced in FIG. 3 by a saline water body 10' that comprises a subterranean saline water body 10'.

Within the context of this second embodiment that is illustrated within the schematic diagram of FIG. 3, the saline water body 10' that comprises the subterranean saline water body 10' may be located above the impermeable layer 12c or below the impermeable layer 12c, although the schematic diagram of FIG. 3 illustrates this particular subterranean saline water body 10' to be above the impermeable layer 12c and the aquifer 13 which comprises an imperviously capped porous rock formation to be below the impermeable layer 12c.

The schematic diagram of FIG. 3 thus illustrates a primarily subterranean system of components of operation, where the subterranean saline water body 10' that is accessed by the saline water intake 14a is depleted to provide the fresh water output 14b and the desalination concentrated brine waste product 14c from the desalination plant 14. Along with the carbon dioxide waste product 16c from the carbon dioxide source 16, the desalination concentrated brine waste product 14c may be optionally mixed, prior to being injected into the aquifer 13 from the mix and pump station 18 through the injection bore 18b that provides an operative connection to the mix and pump station 18.

Such a primarily subterranean system that is illustrated within the schematic diagram of FIG. 3 is desirable for fresh water output 14b production at arid inland locations absent alternative fresh water supplies, but which are nonetheless in the proximity of multiple saline aquifers, or alternatively where an open surface saline water body 10 as illustrated in FIG. 2 may be located at only an economically unfeasible distance from the arid inland locations. Alternatively, such a primarily subterranean system that is illustrated in FIG. 3 may also be located nearer to coastal regions under circumstances where the saline water body 10' that is illustrated in FIG. 3 is less saline than the open surface saline water body 10 that is illustrated in FIG. 2, that typically comprises a seawater saline water body 10. Under such circumstances, desalination operating costs of the desalination plant 14 are reduced insofar as a comparatively less saline water body 10' feedstock provides for reduced energy consumption when desalinating the comparatively less saline water body 10' feedstock to provide the fresh water output 14b, in comparison with the comparatively more saline open surface saline water body 10 that is illustrated in FIG. 2.

The preferred embodiments are illustrative of the invention rather than limiting of the invention. Revisions and modifications may be made to materials structures and dimensions within the context of a method in accordance with the preferred embodiments, while still providing a method in accordance with the invention, further in accordance with the accompanying claims.

What is claimed is:

1. A method for disposal of a desalination concentrated brine waste product comprising:

at a desalination plant, desalinating saline water from a saline water body using a desalination process selected from the group consisting of distillation desalination and reverse osmosis to form fresh water and a desalination concentrated brine waste product, receiving at a pump station present on a surface of an earth body, a quantity of said desalination concentrated brine waste product from said desalination plant;

receiving at said pump station a quantity of carbon dioxide waste product from a carbon dioxide source;

injecting from said pump station a quantity of said desalination concentrated brine waste product and a quantity of carbon dioxide waste product through an earthbody surface layer having a depth of at least several hundred feet;

an intermediate layer comprising rock formations, said intermediate layer being beneath and in contiguous contact with said earthbody surface layer, and penetrating for a depth of several thousand feet into said earthbody;

an impermeable layer formed of impervious rock materials, said impermeable layer providing an impermeable barrier to up-flow of liquid materials and gaseous materials and being beneath and in contiguous contact with said intermediate layer, and penetrating for a depth of several thousand feet into said earthbody, and ultimately into a porous rock formation, said porous rock formation being beneath and in contiguous contact with said impermeable layer including an aquifer being operatively connected to said pump station, wherein separate quantities of said desalination concentrated brine waste product and said carbon dioxide waste product are successively injected to prevent intermixing of said desalination concentrated brine waste product and said carbon dioxide waste product until reaching said porous rock formation including said aquifer, wherein when reaching said porous rock formation including said aquifer, said desalination concentrated brine waste product and said carbon dioxide waste product being mixed to form a mixture having a greater density than a saline material that provides said aquifer, wherein said mixture of said brine waste product and said carbon dioxide waste product sinks to a bottom of said aquifer.

2. The method of claim 1 wherein the porous rock formation comprises an imperviously capped porous rock formation.

3. The method of claim 1 wherein the quantity of the desalination concentrated brine waste product is injected and the quantity of the carbon dioxide waste product is injected at a temperature and a pressure that provide the carbon dioxide waste phase.

4. The method of claim 3 wherein the temperature is greater than 31 degrees centigrade and the pressure is greater than 1070 pounds per square inch.

5. The method of claim 1 wherein the desalination concentrated brine waste product has a saline content up to 80 grams per liter, measured as sodium chloride.

6. A method for desalinating water comprising:
- at a desalination facility, desalinating a quantity of saline water to provide a quantity of fresh water and a quantity of desalination concentrated brine waste product;
- conveying said desalination concentrated brine waste product to a pump station present on a surface of an earth body;
- receiving at the pump station a quantity of carbon dioxide waste product conveyed from a carbon dioxide source; and
- injecting from said pump station said quantity of desalination concentrated brine waste product and said quantity of carbon dioxide waste product through an earthbody surface layer having a depth of at least several hundred feet, an intermediate layer comprising rock formations, said intermediate layer being beneath and in contiguous contact with said earthbody surface layer, and penetrating for a depth of several thousand feet into said earthbody, an impermeable layer formed of impervious rock materials, said impermeable layer providing an impermeable barrier to up-flow of liquid materials and gaseous materials and being beneath and in contiguous contact with said intermediate layer, and penetrating for a depth of several thousand feet into said earthbody, and ultimately
- into a porous rock formation, being beneath and in contiguous contact with said impermeable layer
- including an aquifer operatively connected to the pump station, wherein separate quantities of said desalination concentrated brine waste product and said carbon dioxide waste product are successively injected to prevent intermixing of said desalination concentrated brine waste product and said carbon dioxide waste product until reaching said porous rock formation including said aquifer, wherein when reaching said porous rock formation including said aquifer, said desalination concentrated brine waste product and said carbon dioxide waste product being mixed to form a mixture having a greater density than a saline material that provides the aquifer, wherein said mixture of said concentrated brine waste product and said carbon dioxide waste product sinks to a bottom of said aquifer.

7. The method of claim 6 wherein the desalinating uses an open surface saline water body as a saline water feedstock.

8. The method of claim 6 wherein the desalinating uses a subterranean saline water body as a saline water feedstock.

9. The method of claim 6 wherein the injecting the desalination concentrated brine waste product and the carbon dioxide waste product is undertaken at a temperature and a pressure that provides the carbon dioxide waste product in a supercriticalliquid phase.

10. A method for sequestering carbon dioxide comprising:
- operating a carbon dioxide source plant that produces a carbon dioxide waste product that is conveyed to a pump station that is present on a surface of an earth body;
- at a desalinating facility, desalinating a quantity of saline water to provide a quantity of fresh water and a quantity of desalination concentrated brine waste product;
- receiving at said pump station, a quantity of said desalination concentrated brine waste product from said desalination plant;
- injecting from said pump station said quantity of desalination concentrated brine waste product and said quantity of carbon dioxide waste product through an earthbody surface layer having a depth of at least several hundred feet, an intermediate layer comprising rock formations, said intermediate layer being beneath and in contiguous contact with said earthbody surface layer, and penetrating for a depth of several thousand feet into said earthbody, an impermeable layer formed of impervious rock materials said impermeable layer providing an impermeable barrier to up-flow of liquid materials and gaseous materials and being beneath and in contiguous contact with said intermediate layer, and penetrating for a depth of several thousand feet into said earthbody, and ultimately
- into a porous rock formation being beneath and in contiguous contact with said impermeable layer including an aquifer that is below the surface of said earth body and is operatively connected to pump station, wherein separate quantities of said desalination concentrated brine waste product and said carbon dioxide waste product are successively injected to prevent intermixing of said desalination concentrated brine waste product and said carbon dioxide waste product until reaching said porous rock formation including said aquifer, wherein when reaching said porous rock formation including said aquifer, said desalination concentrated brine waste product and said carbon dioxide waste product being mixed to form a mixture having a greater density than a material that provides said aquifer, wherein the mixture of said concentrated brine waste product and said carbon dioxide waste product sinks to a bottom of said aquifer.

11. The method of claim 10 wherein the carbon dioxide source plant comprises a fossil fueled power plant.

12. The method of claim 10 wherein the carbon dioxide source plant comprises a production fossil fuel facility.

13. The method of claim 10 wherein the porous rock formation comprises an imperviously capped porous rock formation desalinating uses a subterranean saline water that comprises an aquifer.

14. The method of claim 10 wherein the injecting the desalination concentrated brine waste product and the carbon dioxide waste product is undertaken at a temperature and a pressure that provide carbon dioxide waste product in a supercritical liquid phase.

* * * * *